(12) United States Patent
Scott et al.

(10) Patent No.: US 8,069,029 B2
(45) Date of Patent: *Nov. 29, 2011

(54) HANDHELD ELECTRONIC DEVICE HAVING MULTIPLE-AXIS INPUT DEVICE AND SELECTABLE LANGUAGE INDICATOR FOR LANGUAGE SELECTION, AND ASSOCIATED METHOD

(75) Inventors: Sherryl Lee Lorraine Scott, Toronto (CA); Zaheen Somani, Richmond (CA)

(73) Assignee: Research In Motion Limited, Waterloo, Ontario (CA)

( * ) Notice: Subject to any disclaimer, the term of this patent is extended or adjusted under 35 U.S.C. 154(b) by 514 days.

This patent is subject to a terminal disclaimer.

(21) Appl. No.: 11/831,509

(22) Filed: Jul. 31, 2007

(65) Prior Publication Data
US 2008/0114584 A1 May 15, 2008

Related U.S. Application Data

(63) Continuation-in-part of application No. 11/558,628, filed on Nov. 10, 2006.

(51) Int. Cl.
*G06F 17/28* (2006.01)
(52) U.S. Cl. ......... 704/2; 704/3; 704/8; 704/9; 345/169; 379/88.06
(58) Field of Classification Search ............... 704/2, 3, 704/8, 9; 379/88.06; 345/167, 173, 169
See application file for complete search history.

(56) References Cited

U.S. PATENT DOCUMENTS

| | | | |
|---|---|---|---|
| 6,392,640 B1 | 5/2002 | Will | |
| 6,542,170 B1 * | 4/2003 | Williams et al. | 715/816 |
| 7,532,198 B2 * | 5/2009 | Lazaridis et al. | 345/157 |
| 7,616,192 B2 * | 11/2009 | Schroeder | 345/173 |
| 2002/0196163 A1 | 12/2002 | Bradford et al. | |
| 2004/0174398 A1 * | 9/2004 | Luke et al. | 345/856 |
| 2005/0021533 A1 * | 1/2005 | Ayachitula et al. | 707/100 |

(Continued)

FOREIGN PATENT DOCUMENTS
CA 2 541 580 A1 9/2007
(Continued)

OTHER PUBLICATIONS

Ed Bott, Woody Leonhard, Brady Merkel, Kate Chase, David Karlins: "Special Edition Using Microsoft Word 2000—Chapter 26: Word 2000 Multilanguage Features" May 1999 QUE Corporation ISBN: 0-7897-1852-9.

(Continued)

*Primary Examiner* — Talivaldis Ivars Smits
*Assistant Examiner* — Shaun Roberts
(74) *Attorney, Agent, or Firm* — Finnegan, Henderson, Farabow, Garrett & Dunner LLP

(57) ABSTRACT

A method of enabling input into a handheld electronic device comprises detecting as an ambiguous input an actuation of one or more input members, employing an operative input method language to output a number of objects that are selectable and that each comprise at least a portion of a language object that corresponds with the ambiguous input, outputting at a location adjacent the number of objects an indicator representative of an operative input method language, detecting an input from a multiple-axis input device as being a selection input with respect to the indicator and, responsive thereto, enabling a selection of an alternate input method language as the operative input method language.

20 Claims, 11 Drawing Sheets

U.S. PATENT DOCUMENTS

| | | | |
|---|---|---|---|
| 2005/0102620 A1* | 5/2005 | Seto et al. | 715/541 |
| 2005/0119899 A1* | 6/2005 | Palmquist | 704/277 |
| 2005/0198023 A1* | 9/2005 | James et al. | 707/4 |
| 2006/0058995 A1 | 3/2006 | Fux et al. | |
| 2007/0124675 A1* | 5/2007 | Ban et al. | 715/703 |
| 2007/0188462 A1* | 8/2007 | Lee et al. | 345/167 |

FOREIGN PATENT DOCUMENTS

| | | |
|---|---|---|
| DE | 103 53 512 A1 | 6/2005 |
| DE | 112005002100 | 7/2007 |
| EP | 0930760 A2 | 7/1999 |
| WO | 98/33111 A | 7/1998 |
| WO | 2006/062579 A1 | 6/2006 |
| WO | 2006024147 | 9/2006 |
| WO | 2006/113995 A1 | 11/2006 |

OTHER PUBLICATIONS

"Notice Requesting Submission of Opinion" from the Korean Intellectual Property Office, dated Oct. 19, 2010, pp. 1-3.

Office Action from the German Patent and Trademark Office, dated May 4, 2010, pp. 1-4.

* cited by examiner

HANDHELD ELECTRONIC DEVICE HAVING MULTIPLE-AXIS INPUT DEVICE AND SELECTABLE LANGUAGE INDICATOR FOR LANGUAGE SELECTION, AND ASSOCIATED METHOD

CROSS-REFERENCE TO RELATED APPLICATION

This application claims priority from and claims the benefit of U.S. patent application Ser. No. 11/558,628 filed Nov. 10, 2006, the disclosures of which are incorporated herein by reference.

BACKGROUND

1. Field

The disclosed and claimed concept relates generally to electronic devices and, more particularly, to a method for indicating and selecting a language on a handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Handheld electronic devices are used in a variety of language settings and users can often find themselves writing text in multiple languages. For example, a user might reply to one e-mail message in French and another in English. However, in order to utilize a handheld electronic device's advance features, such as disambiguation, the user might have to select the language that, for example, corresponds to the language of the original message to which he/she is replying. Switching among multiple languages can often confuse the user since the user might believe that the currently selected language on the handheld electronic device is one language, but in reality the operative language is another language. Therefore, incorrectly believing that the currently selected language is the desired language, the user might unwittingly begin to enter input which corresponds to the desired language, fully expecting the disambiguation function of the handheld electronic device to correctly disambiguate any ambiguous inputs that the user enters. However, since the currently selected language is the incorrect language, the handheld electronic device will disambiguate the ambiguous inputs based on the other language. Assuming that the user realizes that the currently selected language on the handheld electronic device is not the desired language prior to completing the data entry, the steps required to rectify the situation (e.g. select the correct language and correct any incorrect data) will consume time. It would be desirable to overcome this shortcoming in an efficient fashion that makes the device easier to use.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

When referring to the term "language object" and variations thereof, such designations shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

When referring to the term "linguistic element" and variations thereof, such designations shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

When referring to the term "letter" and variations thereof, such designations are meant to cover all letters of the Latin alphabet regardless of whether the letter is uppercase (Majuscule form) or lowercase (Minuscule form).

When referring to the term "reduced" and variations thereof in the context of a keyboard, a keypad, or other arrangement of input members, such designations shall refer broadly to an arrangement in which at least one of the input members has assigned thereto a plurality of linguistic elements such as, for example, characters in the set of Latin letters.

When referring to the term "window" and variations thereof, such designations by way of example, and not limitation, shall refer to a visualized layer, tile, overlay or other similar variant thereof that is output on a display or screen.

When referring to the phrase "default language" and variations thereof, such designations shall refer to the primary language of the handheld electronic device.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 1:
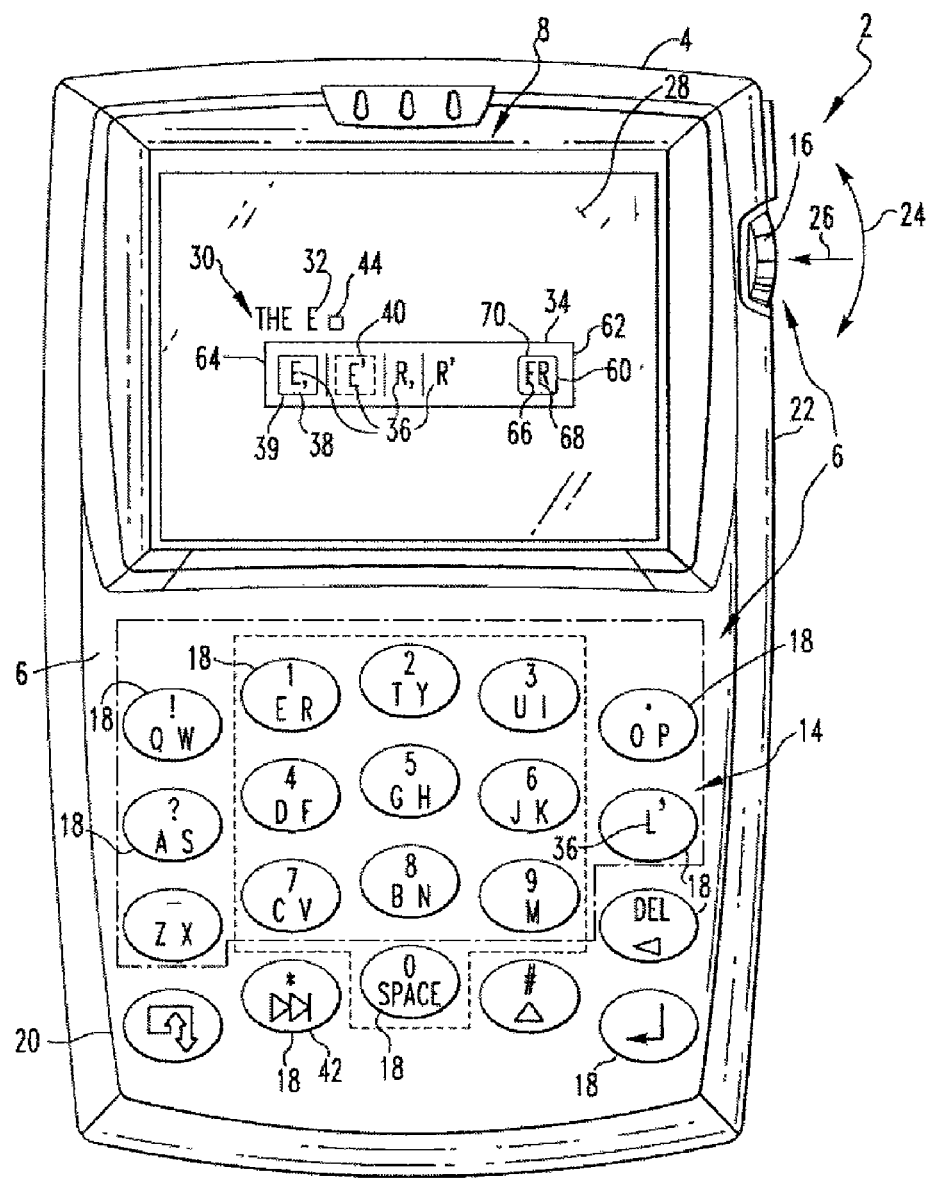
FIG. 1 is a top plan view of an improved handheld electronic device in accordance with the disclosed and claimed concept.
Figure 2:
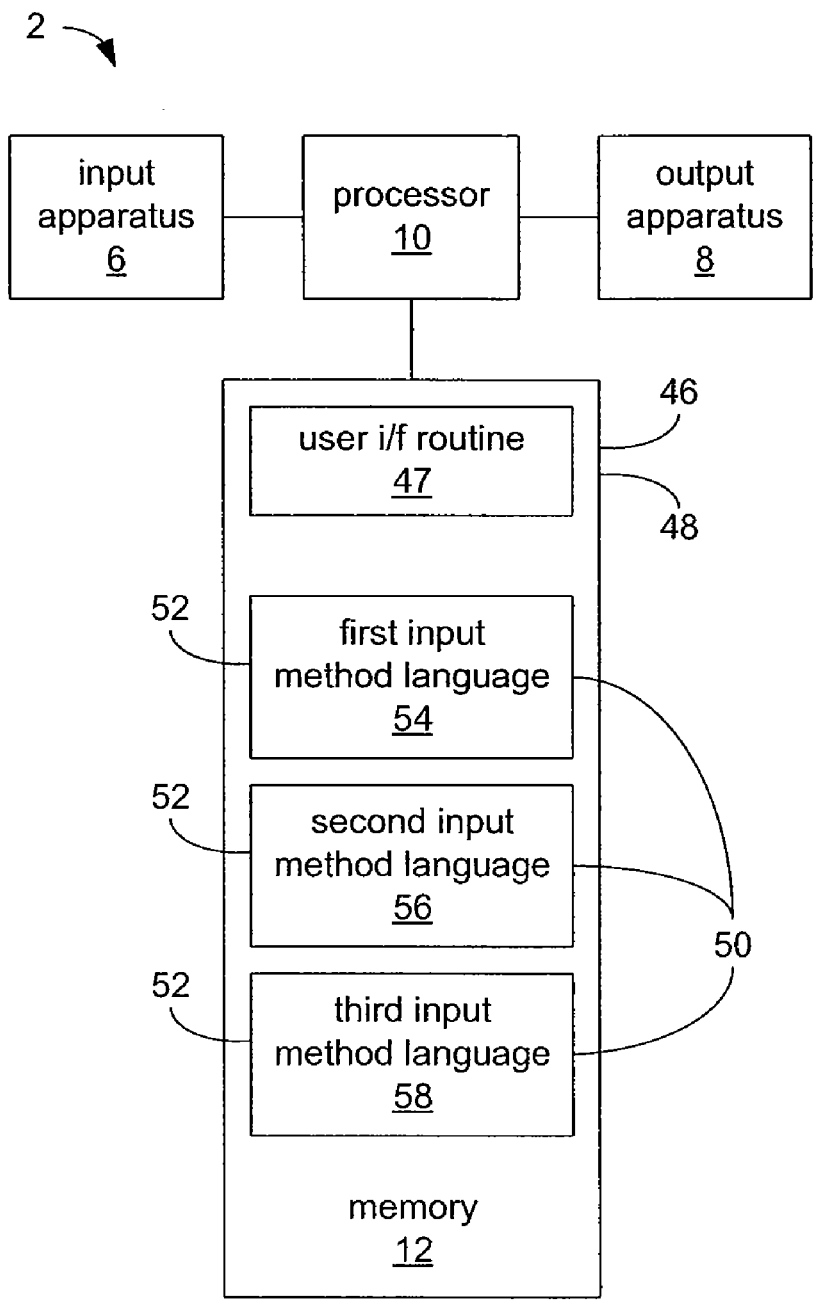
FIG. 2 is a schematic depiction of the improved handheld electronic device of FIG. 1.

An improved handheld electronic device 2 is indicated generally in FIG. 1 and is depicted schematically in FIG. 2. The exemplary handheld electronic device 2 includes a housing 4 upon which is disposed a processor unit that includes an input apparatus 6, an output apparatus 8, a processor 10, and a memory 12. The processor 10 may be, for instance, and without limitation, a microprocessor (μP) and is responsive to inputs from the input apparatus 6 and provides output signals to the output apparatus 8. The processor 10 also interfaces with the memory 12. The processor 10 and the memory 12 together form a processor apparatus.

As can be understood from FIG. 1, the input apparatus 6 includes a keypad 14 and a trackwheel 16. As will be described in greater detail below, the keypad 14 is in the exemplary form of a reduced QWERTY keyboard including a plurality of keys 18 that serve as input members. It is noted, however, that the keypad 14 may be of other configurations, such as an AZERTY keyboard, a QWERTZ keyboard, or other keyboard arrangement, whether presently known or unknown, and either reduced or not reduced.

The keys 18 are located on a front face 20 of the housing 4, and the trackwheel 16 is located at a side 22 of the housing 4. In addition to the keys 18, the trackwheel 16 can serve as another input member since the trackwheel 16 is capable of being rotated, as indicated by arrow 24, and depressed generally toward the housing 4, as indicated by arrow 26. Rotation of the trackwheel 16 provides certain inputs to the processor 10, while depression of the trackwheel 16 provides other input to the processor 10.

The system architecture of the handheld electronic device 2 advantageously is organized to be operable independent of the specific layout of the keypad 14. Accordingly, the system architecture of the handheld electronic device 2 can be employed in conjunction with virtually any keypad layout without requiring any meaningful change in the system architecture. It is further noted that certain features set forth herein are usable on either or both of a reduced keyboard and a non-reduced keyboard.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10.

The memory 12 additionally can include one or more routines depicted generally with the numeral 46 for the processing of data and carrying out other functions, including a user interface routine 47. When executed by the processor 10, the user interface routine 47, possibly in combination with another of the routines 46, causes the processor 10 to receive inputs from the keypad 14, the trackwheel 16 and/or other input devices, and causes the processor 10 to present various forms of output on the display 28 and/or other output devices, as will shortly be explained. In other words, when sequences of instructions of the user interface routine 47 are executed by the processor 10, a user of the handheld electronic device 2 is provided with a way to interact with the handheld electronic device 2. The routines 46 can be in any of a variety of forms such as, without limitation, software, firmware, and the like. Additionally, the memory 12 can also store and make available a variety of data sources 48 such as, without limitation, one or more input method languages (i.e. "language" or "languages") 50 having language objects associated therewith.

The input method languages 50 may also have corresponding linguistic sources 52 such as a generic word list or a language rule set. FIG. 2 depicts the memory 12 as containing three input method languages 50. The first input method language 54 can be English, the second input method language 56 can be French, and the third input method language 58 can be Spanish. It is noted, however, that despite FIG. 2 depicting only three input method languages 54, 56, 58 being stored within memory 12, the total number of input method languages 50 that can be stored in the memory 12 is limited only by the memory's 12 capacity. Once a user selects an input method language 50, the selected input method language becomes the operative input method language and the preferred data source for the handheld electronic device 2. The preferred data source is utilized by the handheld electronic device 2 to disambiguate any ambiguous inputs that are entered into the handheld electronic device 2. It is noted, however, that an input method language can be a default operative input method language, thus being operative without being expressly selected by a user.

Figure 3:
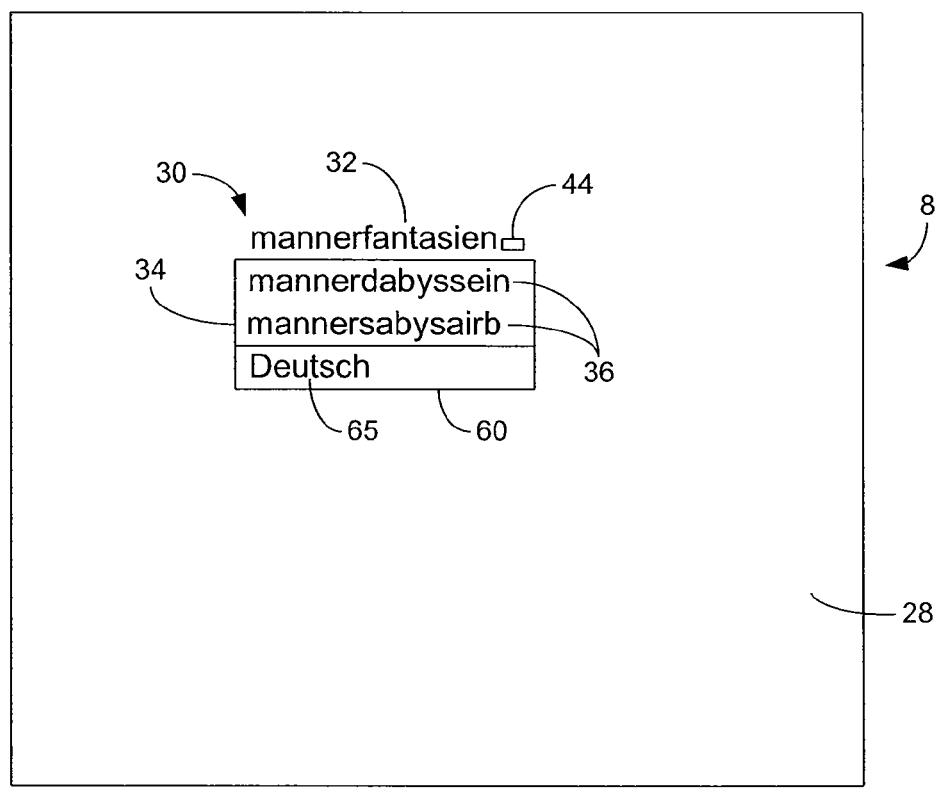
FIG. 3 is a depiction of an output that can be displayed on an output apparatus of the improved handheld electronic device.

Returning to FIG. 1, the output apparatus 8 includes a display 28 upon which can be provided an output 30. An exemplary output 30 on the display 28 is depicted in FIG. 1. The output 30 includes a text component 32 and a window (variant component) 34. As depicted in FIG. 1, the window 34 extends substantially horizontally across the display 28. This, however, is not meant to be limiting since the window 34 can also extend across the display 28 substantially vertically, as depicted in FIG. 3, or in other fashions. Preferably, the window 34 is located generally in the vicinity of the text component 32. The window 34 includes a number of outputs 36 from which the user can select, and a selection box 38 that provides an indication of what is selectable at any given time, as will be explained. As depicted in FIG. 1, the selection box 38 is at a default position 39, thereby indicating that a default one of the outputs 36 is currently selectable. As described in U.S. patent application Ser. No. 10/931,281 entitled "Handheld Electronic device with Text Disambiguation," the outputs 36 are language objects selected from language objects stored in the memory 12 and proposed by the text disambiguation function as being the most likely disambiguated interpretation of the ambiguous input provided by the user.

Figure 4:
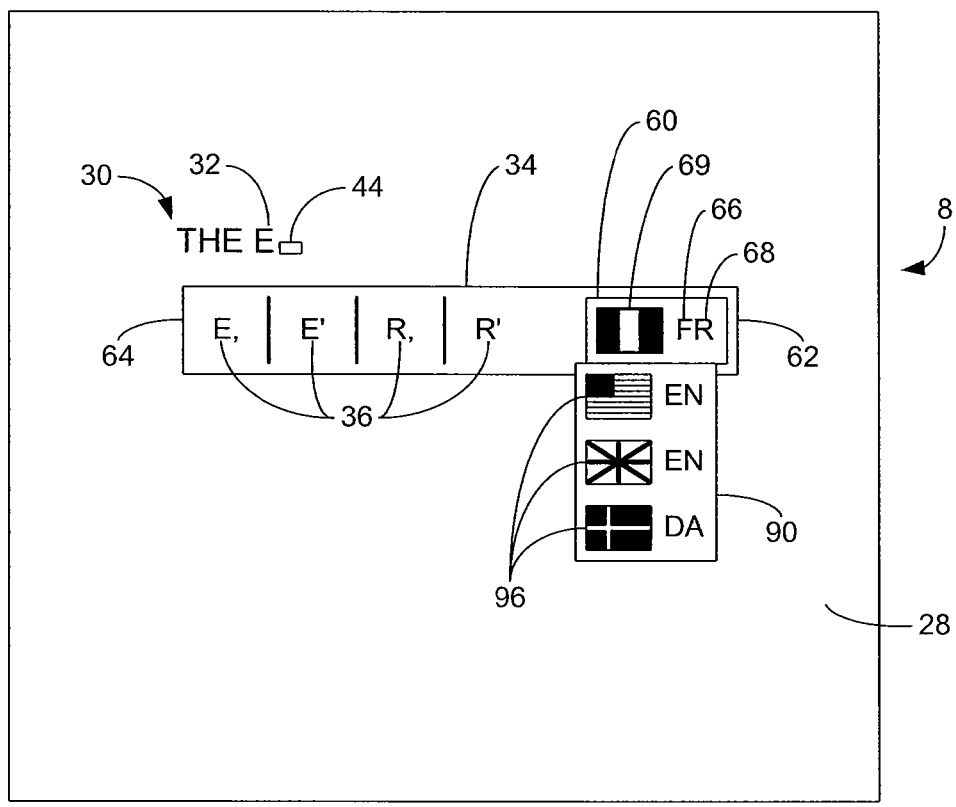
FIG. 4 is a depiction of another output that can be displayed on an output apparatus of the improved handheld electronic device.

As can also be seen in FIG. 1 and FIG. 4, a visual indicator 60, indicating a preferred data source (e.g., grammatical rules and/or vocabulary of a language), is also provided in the window 34. In order to facilitate the entry of text into the handheld electronic device 2 and to prevent user confusion regarding the currently selected language on the handheld electronic device 2, the visual indicator 60 enables a user to quickly identify what language is currently operative. In this particular embodiment, the visual indicator 60 is positioned substantially adjacent to a right end 62 of the window 34. It is noted, however, that the visual indicator 60 can also be positioned substantially adjacent to a left end 64 of the window 34 or in other positions, such as within the caret 44 or on another part of the display 28.

The visual indicator 60 provides a visual identifier of a choice of a language to a user of the handheld electronic device 2. The visual indicator 60 may include one or more of first and second linguistic elements 66 and 68 that form an abbreviation specifying a particular language as depicted in FIG. 1, an unabbreviated name 65 of a language as depicted in FIG. 3, or a graphical symbol 69 representative of a flag or other symbol associated with a particular language as depicted in FIG. 4. The visual indicator 60 may be surrounded by a box 70 and/or may be offset from the outputs 36 to prevent a user from mistakenly identifying the visual indicator 60 as an output 36. Furthermore, the box 70 may be shaped or colored differently from the selection box 38. In the exemplary output depicted in FIG. 1, the visual indicator 60 includes the letters "F" and "R" which is an abbreviation of "French," along with a linguistic symbol 69 providing a representation of the flag of France. Accordingly, as depicted, the visual indicator 60 alerts the user that French is the currently selected language on the handheld electronic device 2.

The selection box 38 is capable of being moved (i.e. shifted) from the default position 39 to a number of different positions 40 by depressing or actuating a <NEXT> key 42 or by rotating the trackwheel 16. The display 28 also includes a caret (cursor) 44 that depicts generally where the next output will be displayed. As the selection box 38 is moved through different ones of the different positions 40, different ones of the outputs 36 become selectable by depressing the trackwheel 16 towards the housing 4, by pressing one of the keys 18 and/or by actuating some other form of input device (not shown) disposed on the housing 4. Upon reaching the last of the outputs 36, the selection box 38 can be moved beyond the last of the outputs 36 and to the visual indicator 60 such that the visual indicator 60 becomes selectable, and in a manner substantially similar to that by which each of the outputs 36 may become selectable. In this way, the visual indicator 60 may be selected in lieu of one of the outputs 36. Furthermore, upon the visual indicator 60 becoming selectable, still further movement of the selection box 38 beyond the last of the outputs 36 and beyond the visual indicator 60 results in a "wrap-around" of the selection box 38 back to the default position 39, in some embodiments. In alternate embodiments, the selection box 38 cannot be moved beyond the visual indicator 60.

Figure 5:
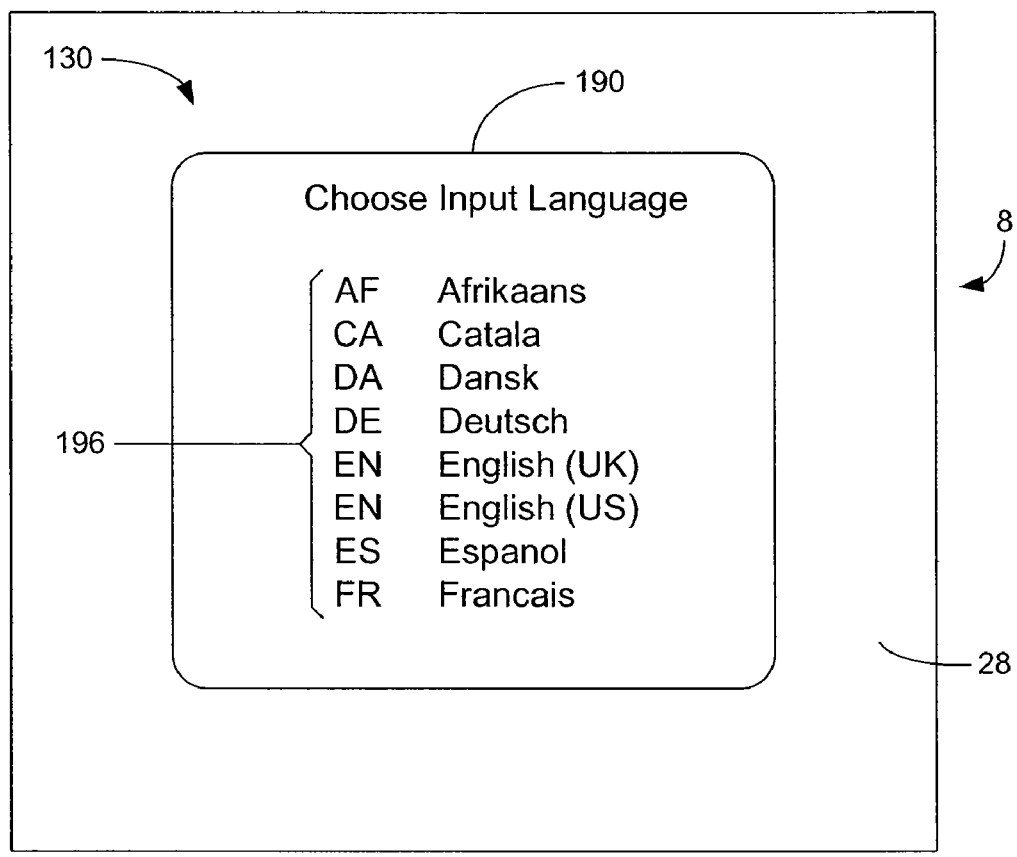
FIG. 5 is a depiction of another output that can be displayed on an output apparatus of the improved handheld electronic device.

Upon the visual indicator 60 both becoming selectable, a user of the handheld electronic device 2 may select the visual indicator 60 by actuating the <NEXT> key 42, depressing the trackwheel 16 or actuating some other form of input device disposed on the housing 4. Selecting the visual indicator 60 allows the user to change the currently selected language. In some embodiments, upon selection of the visual indicator 60, the <NEXT> key 42, the trackwheel 16 and/or some other form of input device disposed on the housing 4 may be used to change in place the currently selected language by changing whichever of the linguistic elements 66 and 68, the unabbreviated name 65 or the graphical symbol 69 is currently displayed as part of the visual indicator 60. In other embodiments, upon selection of the visual indicator 60, a popup window 90 is presented that lists at least a subset of the choices of language 96 that may be selected, as depicted in FIG. 4. The popup window 90 may present each choice of language 96 as one or both of a pair of linguistic characters (not unlike the linguistic characters 66 and 68 within the visual indicator 60) or a graphical symbol (not unlike the graphical symbol 69 within the visual indicator 60). Alternatively or additionally, the popup window 90 may present each choice of language 96 as an unabbreviated name (not unlike the unabbreviated name 65 within the visual indicator 60). In still other embodiments, upon selection of the visual indicator 60, a language selection output 130 is presented on the display 28 in which a language selection menu 190 is displayed, as depicted in FIG. 5, in place of the window 34. As in the case of the popup window 90, the language selection menu 190 may use one or more of a pair of linguistic characters, an unabbreviated name and/or a graphical symbol to present each choice of language 196.

In some embodiments, as the selection box 38 is moved beyond the last of the outputs 36 and to the visual indicator 60, some form of tactile and/or audible feedback may be provided to a user of the handheld electronic device 2 that coincides with the selection box 38 being moved between one of the outputs 36 and the visual indicator 60. Such tactile and/or audible feedback would alert the user to the fact that he or she has progressed beyond the selection of available outputs 36 without the need to view the display 28 at that moment. In one possible embodiment where either the trackwheel 16 or a trackball (not shown) is employed in moving the selection box 38, a tactile feedback akin to a "bump" and/or a momentary resistance to movement may be provided that the user would feel through which ever ones of his or her fingers are employed in operating the trackwheel 16 or the trackball. Various trackwheels and trackballs equipped with a mechanism for causing a translation motion of the wheel or ball in a direction against the user's fingertips are commercially available as those skilled in the art will readily recognize. Such a trackwheel or trackball could be controlled in a manner that provides the user with a sensation that the wheel or ball is being "rolled" over a bump and/or that the wheel or ball is momentarily "stuck" at the moment that the selection box 38 is moved between one of the outputs 36 and the visual indicator 60.

It should be noted that although much of the preceding discussing has specified that the selection box 38 serves as the indication of which item in the window 34 is selectable, those skilled in the art will readily recognize that other visual indicators of which item in the window 34 is selectable may be employed. By way of example, various techniques of highlighting a selectable item may be employed, including, but not limited to, altering one or more colors of the selectable item, itself, such that the selectable item is made to stand out in comparison to one or more non-selectable items, or altering one or more colors of the background immediately adjacent to a selectable item such that the selectable item is surrounded with a distinguishing color.

Figure 6:
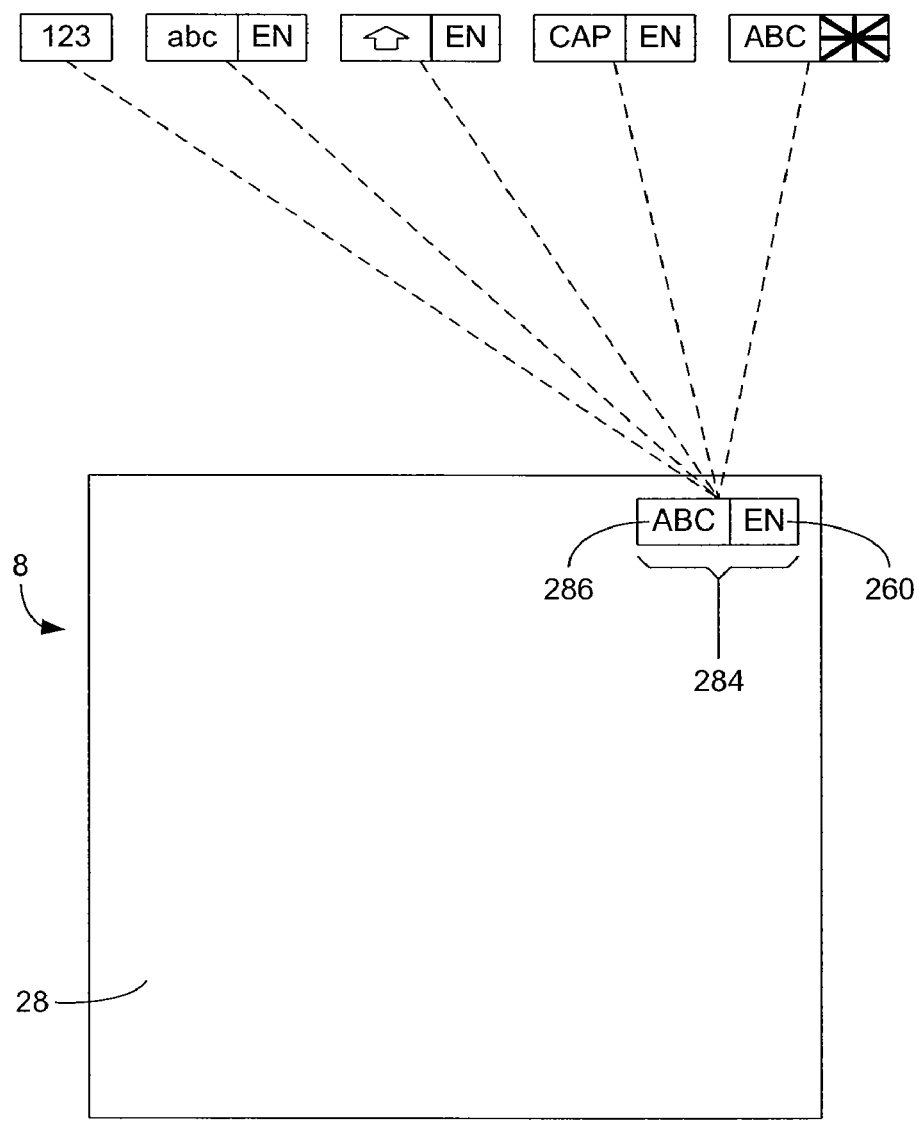
FIG. 6 depicts an input mode indicator on the display.

In some embodiments, as an alternative to presenting an operative language in a visual indicator as part of a window of selectable outputs as part of a disambiguation process, a visual indicator 260 may be presented as part of an input mode indicator 284 presented on a portion of the display 28. As depicted in FIG. 6, the input mode indicator 284 is positioned towards a corner of the display 28 so as to minimize its obstruction of the remainder of the space available on the display 28 for whatever use may be desired by a user of the handheld electronic device 2. The input mode indicator 284 includes a visual indicator 286 that presents information regarding other aspects of the current input mode, such whether a reduced-sized keyboard (e.g., the keypad 14) is currently in a numeric entry mode (as indicated with "123"), a lower-case letter entry mode (as indicated with "abc") or an upper-case letter entry mode (as variously indicated with an upward arrow, or either of "ABC" or "CAP"). As was the case with the earlier-discussed visual indicator 60, the visual indicator 260 may present the current choice of language with an abbreviation (e.g., "EN" as depicted), a graphical symbol (e.g., a flag as depicted), or an unabbreviated name of a language (not shown). In other words, the input mode indicator 284 presents one of a selection of possible input modes that combine a choice of numeric or text entry, a choice of capitalization, and a choice of language in each input mode. FIG. 6 depicts some of the available input modes that may be selected.

The remainder of the space available on the display 28 may be employed by one or more of the routines 46, including the user interface routine 47, to enable input of text or numbers by the user. Not unlike the earlier-described visual indicator 60, the input mode indicator 284 is selectable, though not as part of a list of selectable outputs generated by a disambiguation routine. In some embodiments, a trackball or input device (not shown) that is disposed on the housing 4 may be used to make the input mode indicator 284 selectable by moving a focus of the user interface routine 47 away from an application occupying the remainder of the space available on the display 28 and towards the input mode indicator 284. Upon the input mode indicator 284 being made selectable, and upon the input mode indicator 284 being selected, a different input mode may be selected. In some embodiments, the selection of the input mode indicator 284 results in an input mode selection menu not unlike the earlier-described language selection menu 190 that occupies at least a portion of the remainder of the space available on the display 28. In other embodiments, the selection of the input mode indicator 284 results in the presentation of a smaller popup menu not unlike the earlier-described popup window 90. In still other embodiments, the selection of the input mode indicator 284 allows the user to change in place the input mode indicator 284 (and with it, the associated input mode), perhaps by operating the trackwheel 16 or other input device, such as a trackball.

Figure 7:
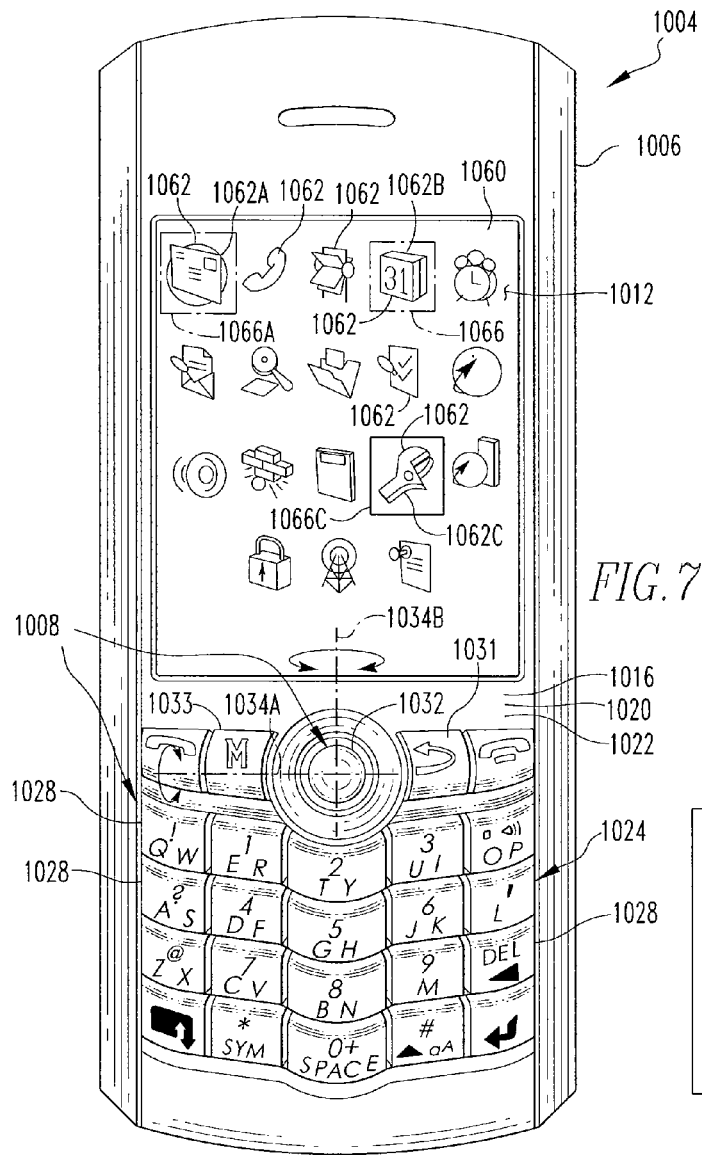
FIG. 7 is a top plan view of an improved handheld electronic device in accordance with another embodiment of the disclosed and claimed concept.

An improved handheld electronic device 1004 in accordance with another embodiment of the disclosed and claimed concept is depicted generally in FIG. 7. As a general matter, the handheld electronic device 1004 is substantially identical in configuration and function to the handheld electronic device 2, except that the handheld electronic device 1004 employs a multiple-axis input device instead of or in addition to the trackwheel 16. In the depicted exemplary embodiment, the multiple-axis input device is a track ball 1032 as will be described below. It is noted, however, that multiple-axis input devices other than the track ball 1032 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The handheld electronic device 1004 includes a housing 1006 upon which is disposed a processor unit that includes an input apparatus 1008, an output apparatus 1012, a processor 1016, a memory 1020, and a number of routines 1022. All of the operations that can be performed on or with the handheld electronic device 2 can be performed on or with the handheld electronic device 1004. As such, the features of the handheld electronic device 2 that are common with the handheld electronic device 1004, and this would comprise essentially all of the features of the handheld electronic device 2, will generally not be repeated.

The output apparatus 1012 includes a display 1060 that provides visual output. The exemplary output in FIG. 7 is a plurality of icons 1062 that are selectable by the user for the purpose of, for example, initiating the execution on the processor 1016 of a routine 1022 that is represented by an icon 1062.

The input apparatus 1008 can be said to comprise a keypad 1024 and the track ball 1032, all of which serve as input members. The keypad 1024 and the track ball 1032 are advantageously disposed adjacent one another. The keypad 1024 comprises a plurality of keys 1028 that are actuatable to provide input to the processor 1016. Many of the keys 1028 have assigned thereto a plurality of linguistic elements in the exemplary form of Latin letters. Other keys 1028 can have assigned thereto functions and/or other characters.

For instance, one of the keys 1028 is an <ESCAPE> key 1031 which, when actuated, provides to the processor 1016 an input that undoes the action which resulted from the immediately preceding input and/or moves the user to a logically higher position within the logical menu tree managed by a graphical user interface (GUI) routine 1022. The function provided by the <ESCAPE> key 1031 can be used at any logical location within any portion of the logical menu tree except, perhaps, at a home screen such as is depicted in FIG. 7. The <ESCAPE> key 1031 is advantageously disposed adjacent the track ball 1032 thereby enabling, for example, an unintended or incorrect input from the track ball 1032 to be quickly undone, i.e., reversed, by an actuation of the adjacent <ESCAPE> key 1031.

Figure 8:
FIG. 8 depicts an exemplary menu that can be output on the handheld electronic device of FIG. 7.
Figure 9:
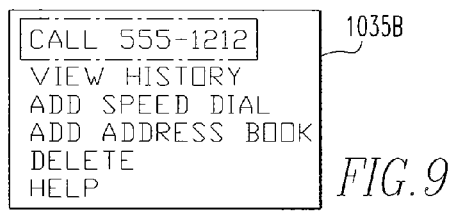
FIG. 9 depicts another exemplary menu.

Another of the keys 1028 is a <MENU> key 1033 which, when actuated, provides to the processor 1016 an input that causes the GUI 1022 to generate and output on the display 1060 a menu that is appropriate to the user's current logical location within the logical menu tree. For instance, FIG. 8 depicts an exemplary menu 1035A that would be appropriate if the user's current logical location within the logical menu tree was viewing an email within an email routine 1022. That is, the menu 1035A provides selectable options that would be appropriate for a user given that the user is, for example, viewing an email within an email routine 1022. In a similar fashion, FIG. 9 depicts another exemplary menu 1035B that would be depicted if the user's current logical location within the logical menu tree was within a telephone routine 1022.

The track ball 1032 is disposed on the housing 1006 and is freely rotatable in all directions with respect to the housing 1006. A rotation of the track ball 1032 a predetermined rotational distance with respect to the housing 1006 provides an input to the processor 1016, and such inputs can be employed by the routines 1022, for example, as navigational inputs, scrolling inputs, selection inputs, and other inputs.

For instance, the track ball 1032 is rotatable about a horizontal axis 1034A to provide vertical scrolling, navigational, selection, or other inputs. Similarly, the track ball 1032 is rotatable about a vertical axis 1034B to provide horizontal scrolling, navigational, selection, or other inputs. Since the track ball 1032 is freely rotatable with respect to the housing 1006, the track ball 1032 is additionally rotatable about any other axis (not expressly depicted herein) that lies within the plane of the page of FIG. 7 or that extends out of the plane of the page of FIG. 7.

The track ball 1032 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 1032 is merely one of many multiple-axis input devices that could be employed on the handheld electronic device 1004. As such, mechanical alternatives to the track ball 1032, such as a joystick, might have a limited rotation with respect to the housing 1006, and non-mechanical alternatives might be immovable with respect to the housing 1006, yet all are capable of providing input in a plurality of directions or along a plurality of axes.

The track ball 1032 additionally is translatable toward the housing 1006, i.e., into the plane of the page of FIG. 7, to provide additional inputs. The track ball 1032 could be translated in such a fashion by, for example, a user applying an actuating force to the track ball 1032 in a direction toward the housing 1006, such as by pressing on the track ball 1032. The inputs that are provided to the processor 1016 as a result of a translation of the track ball 1032 in the indicated fashion can be employed by the routines 1022, for example, as selection inputs, delimiter inputs, or other inputs.

The track ball 1032 is rotatable to provide, for example, navigational inputs among the icons 1062. For example, FIG. 7 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 1060, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 1004. Whenever an icon 1062 or other selectable object is the subject of the selection focus, a selection input to the processor 1016 will result in the routine 1022 or other function represented by the icon 1062 or other selectable object to be executed or initiated.

The movement of the indicator 1066 from the icon 1062A, as indicated with the indicator 1066A, to the icon 1062B, as is indicated by the indicator 1066B, was accomplished by rotating the track ball 1032 about the vertical axis 1034B to provide a horizontal navigational input. As mentioned above, a rotation of the track ball 1032 a predetermined rotational distance results in an input to the processor 1016. In the present example, the track ball 1032 would have been rotated about the vertical axis 1034B a rotational distance equal to three times the predetermined rotational distance since the icon 1062B is disposed three icons 1062 to the right the icon 1062A. Such rotation of the track ball 1032 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 1032 about the horizontal axis 1034A to provide a vertical navigational input. In so doing, the track ball 1032 would have been rotated a rotational distance equal to two times the predetermined rotational distance since the icon 1062C is disposed two icons 1062 below the icon 1062B. Such rotation of the track ball 1032 likely would have been made in a single motion by the user, but this need not necessarily be the case.

It thus can be seen that the track ball 1032 is rotatable in various directions to provide various navigational and other inputs to the processor 1016. Rotational inputs by the track ball 1032 typically are interpreted by whichever routine 1022 is active on the handheld electronic device 1004 as inputs that can be employed by such routine 1022. For example, the GUI 1022 that is active on the handheld electronic device 1004 in FIG. 7 requires vertical and horizontal navigational inputs to move the indicator 1066, and thus the selection focus, among the icons 1062. If a user rotated the track ball 1032 about an axis oblique to the horizontal axis 1034A and the vertical axis 1034B, the GUI 1022 likely would resolve such an oblique rotation of the track ball 1032 into vertical and horizontal components which could then be interpreted by the GUI 1022 as vertical and horizontal navigational movements, respectively. In such a situation, if one of the resolved vertical and horizontal navigational movements is of a greater magnitude than the other, the resolved navigational movement having the greater magnitude would be employed by the GUI 1022 as a navigational input in that direction to move the indicator 1066 and the selection focus, and the other resolved navigational movement would be ignored by the GUI 1022, for example.

When the indicator 1066 is disposed on the icon 1062C, as is indicated by the indicator 1066C, the selection focus of the handheld electronic device 1004 is on the icon 1062C. As such, a translation of the track ball 1032 toward the housing 1006 as described above would provide an input to the processor 1016 that would be interpreted by the GUI 1022 as a selection input with respect to the icon 1062C. In response to such a selection input, the processor 1016 would, for example, begin to execute a routine 1022 that is represented by the icon 1062C. It thus can be understood that the track ball 1032 is rotatable to provide navigational and other inputs in multiple directions, assuming that the routine 1022 that is currently active on the handheld electronic device 1004 can employ such navigational or other inputs in a plurality of directions, and can also be translated to provide a selection input or other input.

Rotational movement inputs from the track ball 1032 could be employed to navigate among, for example, the menus 1035A and 1035B. For instance, after an actuation of the <MENU> key 1033 and an outputting by the GUI 1022 of a resultant menu, the user could rotate the track ball 1032 to provide scrolling inputs to successively highlight the various selectable options within the menu. Once the desired selectable option is highlighted, i.e., is the subject of the selection focus, the user could translate the track ball 1032 toward the housing 1006 to provide a selection input as to the highlighted selectable option. In this regard, it is noted that the <MENU> key 1033 is advantageously disposed adjacent the track ball 1032. This enables, for instance, the generation of a menu by an actuation the <MENU> key 1033, conveniently followed by a rotation the track ball 1032 to highlight a desired selectable option, for instance, followed by a translation of the track ball 1032 toward the housing 1006 to provide a selection input to initiate the operation represented by the highlighted selectable option.

It is further noted that one of the additional inputs that can be provided by a translation of the track ball 1032 is an input that causes the GUI 1022 to output a reduced menu. For instance, a translation of the track ball 1032 toward the housing 1066 could result in the generation and output of a more limited version of a menu than would have been generated if the <MENU> key 1033 had instead been actuated. Such a reduced menu would therefore be appropriate to the user's current logical location within the logical menu tree and would provide those selectable options which the user would have a high likelihood of selecting. Rotational movements of the track ball 1032 could provide scrolling inputs to scroll among the selectable options within the reduced menu 1035C, and translation movements of the track ball 1032 could provide selection inputs to initiate whatever function is represented by the selectable option within the reduce menu 1032 that is currently highlighted.

Figure 10:
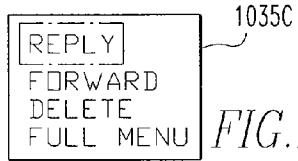
FIG. 10 depicts an exemplary reduced menu.

By way of example, if instead of actuating the <MENU> key 1033 to generate the menu 1035A the user translated the track ball 1032, the GUI 1022 would generate and output on the display the reduced menu 1035C that is depicted generally in FIG. 10. The exemplary reduced menu 1035C provides as selectable options a number of the selectable options from the menu 1035A that the user would be most likely to select. As such, a user seeking to perform a relatively routine function could, instead of actuating the <MENU> key 1033 to display the full menu 1035A, translate the track ball 1032 to generate and output the reduced menu 1035C. The user could then conveniently rotate the track ball 1032 to provide scrolling inputs to highlight a desired selectable option, and could then translate the track ball 1032 to provide a selection input which would initiate the function represented by the selectable option in the reduced menu 1035C that is currently highlighted.

In the present exemplary embodiment, many of the menus that could be generated as a result of an actuation of the <MENU> key 1033 could instead be generated and output in reduced form as a reduced menu in response to a translation of the track ball 1032 toward the housing 1006. It is noted, however, that a reduced menu might not be available for each full menu that could be generated from an actuation of the <MENU> key 1033. Depending upon the user's specific logical location within the logical menu tree, a translation of the track ball 1032 might be interpreted as a selection input rather than an input seeking a reduced menu. For instance, a translation of the track ball 1032 on the home screen depicted in FIG. 7 would result in a selection input as to whichever of the icons 1062 is the subject of the input focus. If the <MENU> key 1033 was actuated on the home screen, the GUI 1022 would output a menu appropriate to the home screen, such as a full menu of all of the functions that are available on the handheld electronic device 1004, including those that might not be represented by icons 1062 on the home screen.

Figure 11:
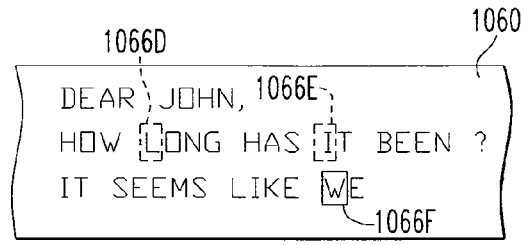
FIG. 11 is an exemplary output such as could occur during a text entry or text editing operation.

FIG. 11 depicts a quantity of text that is output on the display 1060, such as during a text entry operation or during a text editing operation, for example. The indicator 1066 is depicted in FIG. 11 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 7, the cursor 1066 was moved among the letters "L", "I", and "W" through the use of horizontal and vertical navigational inputs resulting from rotations of the track ball 1032. In the example of FIG. 11, however, each rotation of the track ball 1032 the predetermined rotational distance would move the indicator 1066 to the next adjacent letter. As such, in moving the indicator 1066 between the letters "L" and "I," the user would have rotated the track ball 1032 about the vertical axis 1034B a rotational distance equal to nine times the predetermined rotational distance, for example, since "I" is disposed nine letters to the right of "L".

Figure 12:
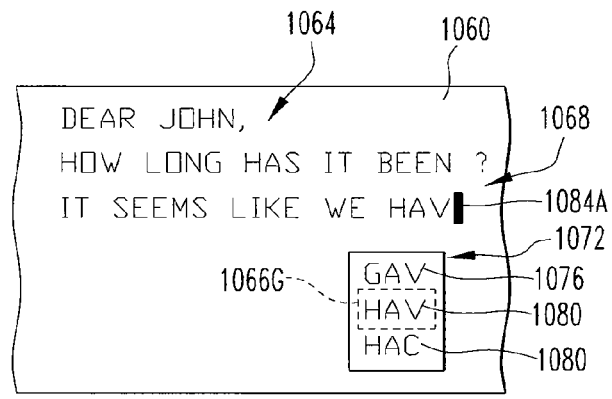
FIG. 12 is an exemplary output during a text entry operation.

FIG. 12 depicts an output 1064 on the display 1060 during, for example, a text entry operation that employs the disambiguation routine 1022. The output 1064 can be said to comprise a text component 1068 and a variant component 1072. The variant component 1072 comprises a default portion 1076 and a variant portion 1080. FIG. 12 depicts the indicator 1066G on the variant 1080 "HAV", such as would result from a rotation of the track ball 1032 about the horizontal axis 1034A to provide a downward vertical scrolling input. In this regard, it is understood that a rotation of the track ball 1032 a distance equal to the predetermined rotational distance would have moved the indicator 1066 from a position (not expressly depicted herein) disposed on the default portion 1076 to the position disposed on the first variant 1080, as is depicted in FIG. 12. Since such a rotation of the track ball 1032 resulted in the first variant 1080 "HAV" being highlighted with the indicator 1066G, the text component 1068 likewise includes the text "HAV" immediately preceding a cursor 1084A.

Figure 13:
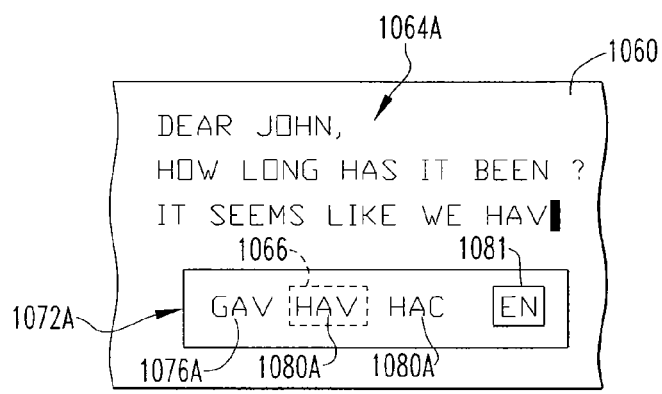
FIG. 13 is an alternative exemplary output during a text entry operation.

FIG. 13 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 1032 the predetermined rotational distance about the vertical axis 1034B. This is to be contrasted with the variant component 1072 of FIG. 12 wherein the default portion 1076 and the variants 1080 are vertically arranged, and which can be sequentially selected by the user through the user of vertical scrolling inputs with the track ball 1032.

In this regard, it can be understood that the track ball 1032 can provide both the vertical scrolling inputs employed in conjunction with the output 1064 as well as the horizontal scrolling inputs employed in conjunction with the output 1064A. For instance, the disambiguation routine 1022 potentially could allow the user to customize the operation thereof by electing between the vertically arranged variant component 1072 and the horizontally arranged variant component 1072A. The track ball 1032 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 1032 can be rotated about the horizontal axis 1034A to provide the vertical scrolling inputs employed in conjunction with the variant component 1072, and also can be rotated about the vertical axis 1034B to provide the horizontal scrolling inputs that are employed in conjunction with the variant component 1064A. The track ball 1032 thus could provide appropriate navigational, strolling, selection, and other inputs depending upon the needs of the routine 1022 active at any time on the handheld electronic device 1004. The track ball 1032 enables such navigational, strolling, selection, and other inputs to be intuitively generated by the user through rotations of the track ball 1032 in directions appropriate to the active routine 1022, such as might be indicated on the display 1060. Other examples will be apparent.

It can further be seen from FIG. 13 that the variant component 1072A additionally includes a value 1081 that is indicative of the language into which the disambiguation routine 1022 will interpret ambiguous text input. In the example depicted in FIG. 13, the language is English.

Figure 14:
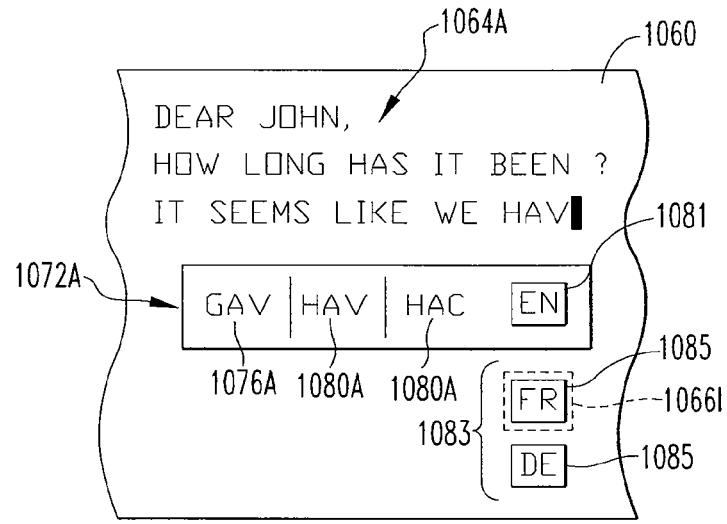
FIG. 14 is another exemplary output during a part of text entry operation.

As can be seen in FIG. 14, the value 1081 can be selected by the user to cause the displaying of a list 1083 of alternative values 1085. The alternative values 1085 are indicative of selectable alternative languages into which the disambiguation routine 1022 can interpret ambiguous input. A selection of the value 1081 would have been achieved, for example, by the user providing horizontal scrolling inputs with the track ball 1032 to cause (not expressly depicted herein) the indicator 1066 to be disposed over the value 1081, and by thereafter translating the track ball 1032 toward the housing 1006 to provide a selection input.

The alternative values 1085 in the list 1083 are vertically arranged with respect to one another and with respect to the value 1081. As such, a vertical scrolling input with the track ball 1032 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 1032 again, by continuing to enter text, or in other fashions. It thus can be understood from FIG. 13 and FIG. 14 that the track ball 1032 can be rotated to provide horizontal scrolling inputs and, when appropriate, to additionally provide vertical scrolling inputs and, when appropriate, to additionally provide selection inputs, for example.

Figure 15:
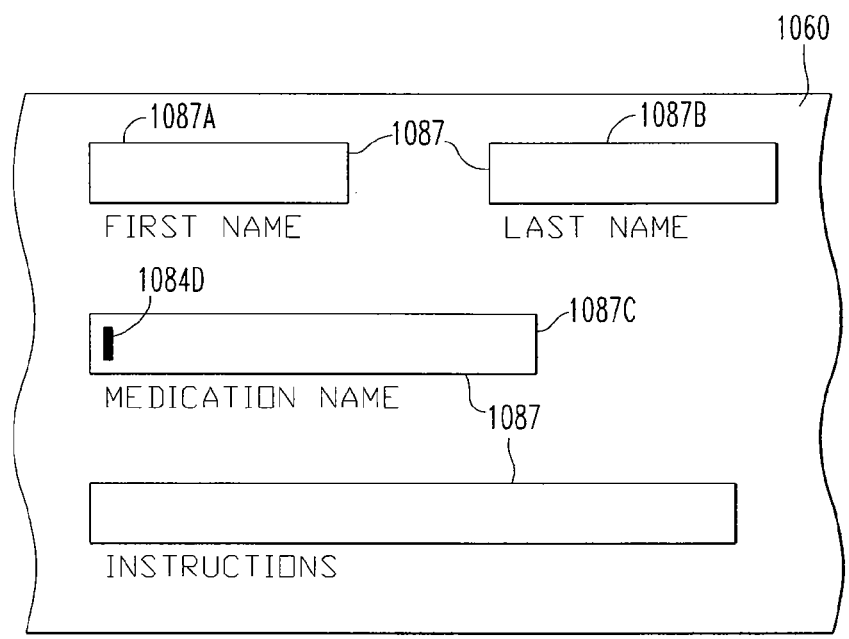
FIG. 15 is an exemplary output during a data entry operation.

FIG. 15 depicts another exemplary output on the display 1060 such as might be employed by a data entry routine 1022. The exemplary output of FIG. 15 comprises a plurality of input fields 1087 with corresponding descriptions. A cursor 1084D, when disposed within one of the input fields 1087, indicates to the user that an input focus of the handheld electronic device 1004 is on that input field 1087. That is, data such as text, numbers, symbols, and the like, will be entered into whichever input field 1087 is active, i.e., is the subject of the input focus. It is understood that the handheld electronic device 1004 might perform other operations or take other actions depending upon which input field 1087 is the subject of the input focus.

Navigational inputs from the track ball 1032 advantageously enable the cursor 1084D, and thus the input focus, to be switched, i.e., shifted, among the various input fields 1087. For example, the input fields 1087 could include the input fields 1087A, 1087B, and 1087C. FIG. 15 depicts the cursor 1084D as being disposed in the input field 1087C, indicating that the input field 1087C is the subject of the input focus of the handheld electronic device 1004. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 1032. That is, the track ball 1032 would be rotated the predetermined rotational distance about the horizontal axis 1034. Similarly, the cursor 1084D, and thus the input focus, can be shifted from the input field 1087A to the input field 1087B, which is disposed adjacent and to the right of the input field 1087A, by providing a horizontal scrolling input to the right with the track ball 1032. That is, such a horizontal scrolling input could be provided by rotating the track ball the predetermined rotational distance about the vertical axis 1034B. It thus can be seen that the track ball 1032 is rotatable in a plurality of directions about a plurality axes to provide navigational, scrolling, and other inputs in a plurality of directions among a plurality of input fields 1087. Other types of inputs and/or inputs in other applications will be apparent.

Since the keypad 1024 and the track ball 1032 are advantageously disposed adjacent one another, the user can operate the track ball 1032 substantially without moving the user's hands away from the keypad 1024 during a text entry operation or other operation. It thus can be seen that the track ball 1032 combines the benefits of both the trackwheel 16 and the <NEXT> key 40. It is noted, however, that other embodiments of the handheld electronic device 1004 (not expressly depicted herein) could include both the track ball 1032 and a <NEXT> key such as the <NEXT> key 40 without departing from the present concept.

Figure 16:
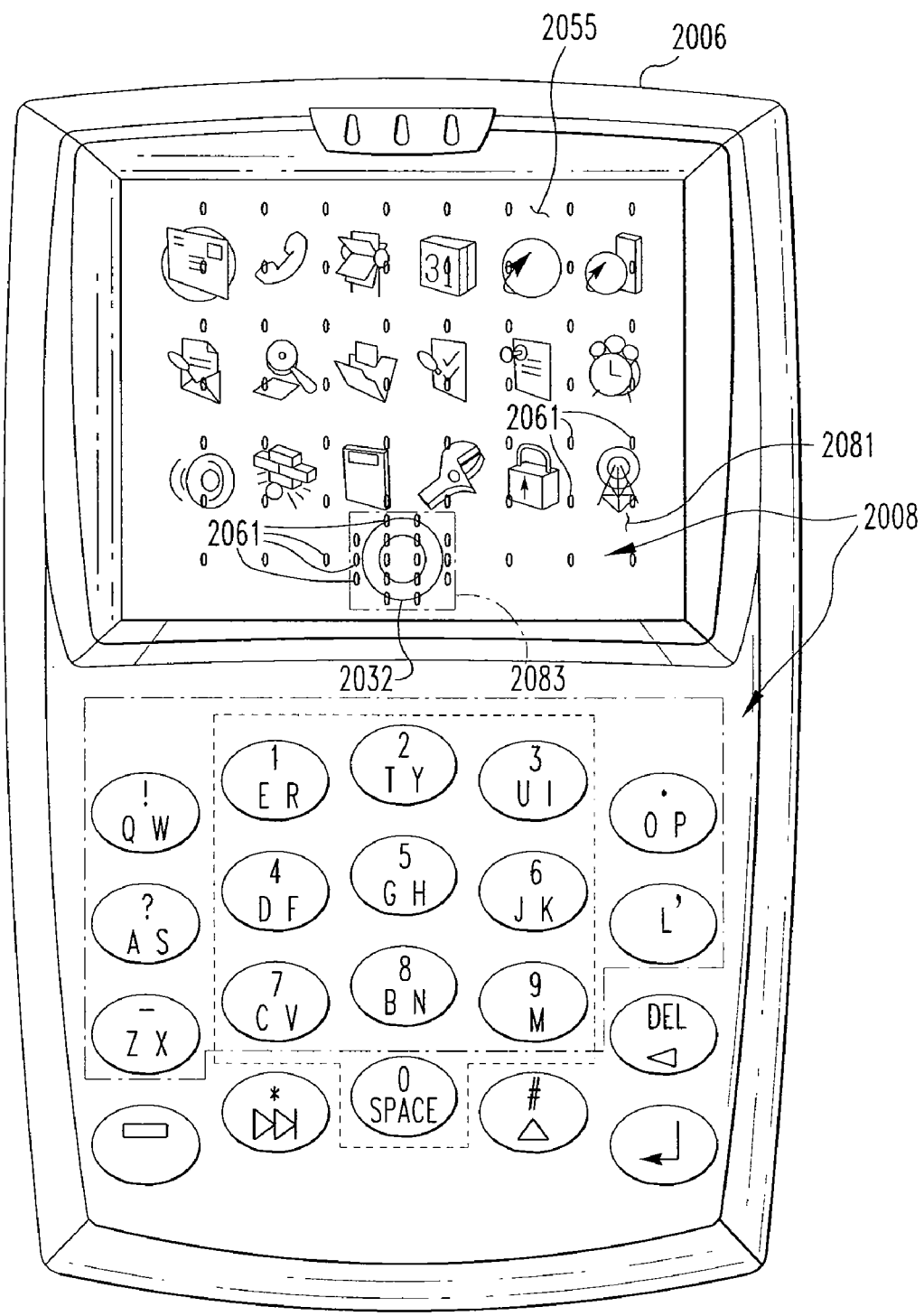
FIG. 16 is a top plan view of an improved handheld electronic device in accordance with still another embodiment of the disclosed and claimed concept.
Figure 17:
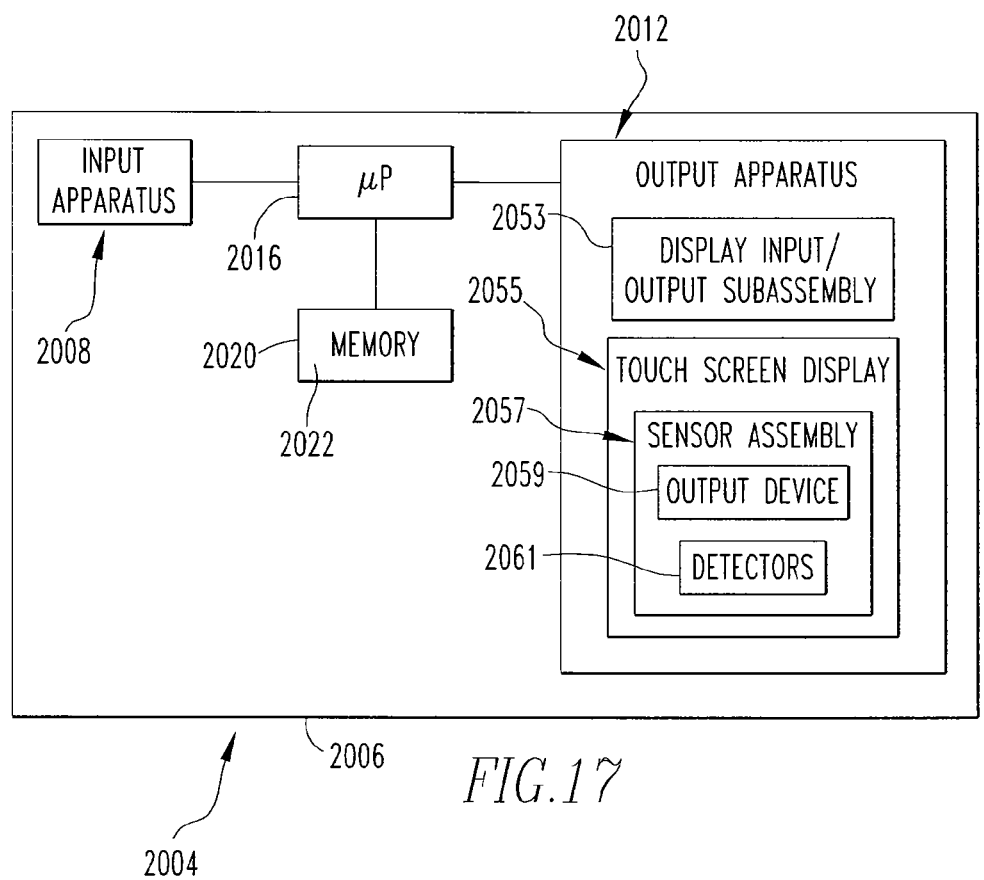
FIG. 17 is a schematic depiction of the improved handheld electronic device of FIG. 16.

An improved handheld electronic device 2004 in accordance with still another embodiment of the disclosed and claimed concept is depicted generally in FIG. 16 and FIG. 17.

The handheld electronic device 2004 includes a housing 2006 upon which is disposed a processor unit that includes an input apparatus 2008, an output apparatus 2012, a processor 2016, a memory 2020, and a number of routines 2022. All of the operations that can be performed on or with the handheld electronic devices 2 and/or 1004 can be performed on or with the handheld electronic device 2004. As such, the features of the handheld electronic device 2004 that are common with the handheld electronic devices 2 and/or 1004, and this would comprise essentially all of the features of the handheld electronic devices 2 and/or 1004, will generally not be repeated.

As a general matter, the handheld electronic device 2004 is substantially identical in configuration and function to the handheld electronic device 1004, except that the handheld electronic device 2004 includes a touch screen display 2055 that provides a non-mechanical multiple-axis input device 2032 instead of the track ball 1032. The multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 16, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 1032 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 1032 of the handheld electronic device 1004. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input into a handheld electronic device having an input apparatus, an output apparatus, a processor, and having available therein a plurality of input method languages and a text disambiguation function that is structured to employ an operative one of the input method languages, the input apparatus having a number of input members including a multiple-axis input device, at least some of the input members each having assigned thereto a plurality of linguistic elements, the method comprising:
   detecting as an ambiguous input an actuation of one or more of the input members;
   employing an operative input method language to output, in response to the actuation of one or more of the input members, a plurality of selectable language objects that each comprise at least a portion of a language object that corresponds with the ambiguous input;
   outputting, in response to the actuation of one or more of the input members and at a location adjacent the plurality of selectable language objects, an indicator that provides the identity of the operative input method language being used by the text disambiguation function;
   detecting an input from the multiple-axis input device as being a selection input with respect to the indicator and, responsive thereto, enabling a selection of an alternate input method language as the operative input method language; and
   replacing the output indicator and the output plurality of selectable language objects to reflect a selection of the alternate input method language.

2. The method of claim 1, further comprising outputting the number of objects towards a first end of a window on a display of the output apparatus and outputting the indicator towards a second end of the window.

3. The method of claim 1, further comprising outputting as at least a portion of the indicator a plurality of linguistic elements comprising an abbreviation of a name of a language.

4. The method of claim 1, further comprising outputting as at least a portion of the indicator a graphical representation of a flag.

5. The method of claim 1, further comprising detecting a preceding input from the multiple-axis input device as being a scrolling input through the number of objects to reach the indicator.

6. The method of claim 5, further comprising detecting a rotation of the multiple-axis input device as being the scrolling input.

7. The method of claim 6, further comprising detecting an actuation of the multiple-axis input device as being the selection input.

8. The method of claim 1, further comprising detecting an input from a touch screen display as being the input from the multiple-axis input device.

9. The method of claim 8, further comprising outputting on the touch screen display a depiction representative of the multiple-axis input device.

10. The method of claim 1, further comprising detecting a further input from the multiple-axis input device as being a scrolling input through a number of indicators representative of alternate input method languages.

11. The method of claim 10, further comprising detecting an additional input from the multiple-axis input device as being a selection input with respect to an indicator representative of one of the alternate input method languages and, responsive thereto, employing the one of the alternate input method languages as the operative input method language.

12. A handheld electronic device, comprising:
a keyboard having a plurality of input members including a multiple-axis input device, at least some of the input members having assigned thereto a plurality of linguistic elements;
a display; and
a processor apparatus comprising a processor and a memory having stored therein a plurality of input method languages and a text disambiguation function structured to employ one of the input method languages, the memory having stored therein a number of routines which, when executed on the processor, cause the handheld electronic device to perform operations comprising:
detecting as an ambiguous input an actuation of one or more of the input members;
employing an operative input method language to output, in response to the actuation of one or more of the input members, a plurality of selectable language objects that each comprise at least a portion of a language object that corresponds with the ambiguous input;
outputting, in response to the actuation of one or more of the input members and at a location adjacent the plurality of selectable language objects, an indicator that provides the identity of the operative input method language being used by the text disambiguation function;
detecting an input from the multiple-axis input device as being a selection input with respect to the indicator and, responsive thereto, enabling a selection of an alternate input method language as the operative input method language; and
upon selection of the alternate input method language using the multiple-axis input device, changing the indicator and the plurality of selectable language objects to be displayed in the alternative input method language.

13. The handheld electronic device of claim 12 wherein the operations further comprise detecting a preceding input from the multiple-axis input device as being a scrolling input through the number of objects to reach the indicator.

14. The handheld electronic device of claim 13 wherein the operations further comprise detecting a rotation of the multiple-axis input device as being the scrolling input.

15. The handheld electronic device of claim 14 wherein the operations further comprise detecting an actuation of the multiple-axis input device as being the selection input.

16. The handheld electronic device of claim 12 wherein the operations further comprise detecting an input from a touch screen display as being the input from the multiple-axis input device.

17. The handheld electronic device of claim 16 wherein the operations further comprise outputting on the touch screen display a depiction representative of the multiple-axis input device.

18. The handheld electronic device of claim 12 wherein the operations further comprise detecting a further input from the multiple-axis input device as being a scrolling input through a number of indicators representative of alternate input method languages.

19. The handheld electronic device of claim 18 wherein the operations further comprise detecting an additional input from the multiple-axis input device as being a selection input with respect to an indicator representative of one of the alternate input method languages and, responsive thereto, employing the one of the alternate input method languages as the operative input method language.

20. The handheld electronic device of claim 12, wherein the multi-axis input device is a track ball that is rotatable about a vertical axis to provide scrolling and selection input.

* * * * *